(12) United States Patent
Gillet

(10) Patent No.: US 10,183,439 B2
(45) Date of Patent: Jan. 22, 2019

(54) METHOD FOR HYDROFORMING A CONTAINER FROM A PREFORM

(71) Applicant: DISCMA AG, Zürich (CH)

(72) Inventor: Denis Gillet, Octeville sur Mer (FR)

(73) Assignee: DISCMA AG, Zürich (CH)

( * ) Notice: Subject to any disclaimer, the term of this patent is extended or adjusted under 35 U.S.C. 154(b) by 0 days.

(21) Appl. No.: 15/871,701

(22) Filed: Jan. 15, 2018

(65) Prior Publication Data

US 2018/0133949 A1    May 17, 2018

Related U.S. Application Data

(62) Division of application No. 14/703,492, filed on May 4, 2015, now Pat. No. 9,889,596.

(30) Foreign Application Priority Data

May 4, 2014  (EP) .................................. 14305658

(51) Int. Cl.
*B29C 49/76*    (2006.01)
*B29C 49/46*    (2006.01)
(Continued)

(52) U.S. Cl.
CPC .............. *B29C 49/76* (2013.01); *B29C 49/28* (2013.01); *B29C 49/58* (2013.01); *B29C 49/06* (2013.01); *B29C 49/12* (2013.01); *B29C 49/46* (2013.01); *B29C 2049/4294* (2013.01); *B29C 2049/465* (2013.01); *B29C 2049/4652* (2013.01); *B29C 2049/4655* (2013.01); *B29C 2049/4658* (2013.01); *B29C 2049/5862* (2013.01); *B29L 2031/712* (2013.01); *B29L 2031/7158* (2013.01)

(58) Field of Classification Search
CPC .............. B29C 49/46; B29C 2049/465; B29C 2049/4652; B29C 2049/4655; B29C 2049/4658; B29C 2049/4664; B29C 2049/4294; B29C 49/76
See application file for complete search history.

(56) References Cited

U.S. PATENT DOCUMENTS 5,200,134 A    4/1993    Collombin et al.
5,850,681 A    12/1998   La Barre

FOREIGN PATENT DOCUMENTS

EP         2151310 A2       2/2010
WO    2012/076576 A2       6/2012
(Continued)

OTHER PUBLICATIONS

European Search Report for EP Application No. 14305658 dated Jul. 4, 2014.

*Primary Examiner* — Robert B Davis
(74) *Attorney, Agent, or Firm* — Eric J. Sosenko; Jonathan P. O'Brien; Honigman Miller Schwartz and Cohn LLP

(57) ABSTRACT

A method of hydroforming a container from a preform. During the method, an injection nozzle is moved from a retracted position, where the nozzle is spaced away from the neck of the preform, to an intermediate position, where contact is established between a first contact surface of the nozzle and the finish of the preform. The nozzle is then moved from the intermediate position to an injection position, where a second contact surface of the nozzle abuts an abutment surface and the neck is axially compressed. With the nozzle in the injection position, a liquid is injected from the nozzle into the preform causing the preform to expand and form the container.

10 Claims, 6 Drawing Sheets

(51) Int. Cl.
*B29C 49/28* (2006.01)
*B29C 49/58* (2006.01)
*B29L 31/00* (2006.01)
*B29C 49/42* (2006.01)
*B29C 49/06* (2006.01)
*B29C 49/12* (2006.01)

(56) References Cited

FOREIGN PATENT DOCUMENTS

| | | |
|---|---|---|
| WO | 2013/063453 A1 | 5/2013 |
| WO | 2013/096609 A1 | 6/2013 |

METHOD FOR HYDROFORMING A CONTAINER FROM A PREFORM

CROSS-REFERENCE TO RELATED APPLICATIONS

This application is a divisional of U.S. application Ser. No. 14/703,492, filed May 4, 2015, which claims priority to European application no. 14305658.8, filed May 5, 2014. The entire disclosures of the above applications are incorporated herein by reference.

TECHNICAL FIELD OF THE INVENTION

The invention generally relates to the field known as hydroforming, which is the forming containers from preforms using an end product liquid to simultaneously both deform the preforms and fill the obtained containers with the liquid. More particularly, the invention relates to a method for forming a container from a preform, by injecting a liquid in the preform using an injection nozzle.

As used herein, "liquid" has a physical meaning. It designates any substantially incompressible medium able to flow. The liquid can have a low viscosity (like water or alcohol), a medium viscosity (like edible oil or soup), or a high viscosity (like yogurt or creamy product). The liquid can be homogeneous or not homogeneous (including fruit pulp or bits of foodstuff). It is also not limited to foodstuff. The liquid may be for example water, or other beverages, body care products, home and garden care products, medical fluids, fuels, operating fluids, and the like.

BACKGROUND

In the technical field of forming containers, hygiene is a very important issue in order to prevent any risk of contamination of the content of the containers, for example bottles with products intended to be ingested by consumers or applied on their skin. Consequently, preventing the contamination of any parts of the containers, of the hydroforming station, and of the liquid filling the containers is a fundamental issue.

As shown in FIG. 1, a typical preform 1 has a neck 3 extending along an axial direction D, which is generally vertical. The neck comprises a support ring 5 protruding radially, and a finish 7 axially opposed to the support ring.

A known type of station, such as the one shown in FIG. 1, comprises a mold 9 in which the preform 1 is placed, the support ring 5 having a first contact surface 11 in contact with a support surface 13 of the mold, with the neck protruding out of the mold.

The station also comprises an injection nozzle 15 that is movable along the axial direction D with respect to the mold 9 from a retracted position (FIG. 1), wherein the nozzle is away from the neck 3, to a work position wherein the neck 3 is received in a housing 17 defined by the injection nozzle. The housing 17 is in fluidic communication with the interior of the preform 1 and with a source 19 of the liquid to be injected into the preform. It is used for forming a container having the shape of the mold cavity. The injected liquid urges the preform 1 and expands it against the mold cavity. In its work position, the nozzle 15 abuts on an upper surface 21 of the mold 9. A drawback of such a forming station is that the injected liquid may contaminate the outside lateral screw surface of the neck.

As described in document WO-A-2013/096609, especially in its paragraph [0041] and FIG. 4, the injection nozzle may include a seal 71 arranged to lie on the finish of the preform in order to prevent any leak of liquid outside of the neck during the injection of the liquid into the preform and thus to prevent contamination of the external wall of the neck by the injected liquid.

A seal is typically a ring made of a compressible material that is softer than a surface of the nozzle on which the seal is fixed and softer than the neck when the seal is pressed against the finish. As an example, such a seal may be made of elastomeric material or silicone.

In order to achieve a high production rate of the hydroforming station, the nozzle is moved back and forth at high frequency, such as 1 Hz, from the retracted position to the work position. As the nozzle is a rather heavy part, of typically 50 kg, large forces, in the range of 3000 N, are applied on it in order to achieve these quick movements. To resist such a large axial force, the moving nozzle applies against the mold.

When the nozzle is applied upon the mold, the seal is pressed against the finish in order to provide a liquid tight sealing between the nozzle outlet and the inner volume of the preform. However, the frequency of the up and down movements may eventually damage the seal in such a way that leaks occur. Also, bits of the seal may ultimately contaminate the liquid injected in the preform. Furthermore, with such production rates, the seal has a short life duration and must be regularly replaced. During replacement, the station is idle, which reduces the production rate.

One of the aims of the invention is to provide a method for hydroforming a container that eliminates or at least reduces the leak problems, while remaining economical and enabling a high production output.

SUMMARY OF THE INVENTION

To this end, in one aspect the invention provides assembly of a preform and a station for hydroforming a container from the preform, wherein: the preform has a neck extending along an axial direction, the neck comprising a support ring protruding radially, and a finish axially opposed to the support ring; a mold in which the preform is placed, the support ring being in contact with a support surface of the mold; an injection nozzle that is movable along the axial direction with respect to the mold from a retracted position, wherein the nozzle is away from the neck, to an intermediate position, wherein a contact is established between a first contact surface of the nozzle and the finish, and further to an injection position, wherein a second contact surface of the nozzle abuts on an abutment surface and the neck is axially compressed between the support surface and the first contact surface, the first contact surface being less deformable than the neck in the axial direction; and wherein a liquid is injected from the nozzle into the preform when the nozzle is in the injection position, and the abutment surface is fixed along the axial direction with respect to the mold at least during the injection.

With the assembly, there is no need for a sealing ring between the finish of the preform and the injection nozzle. However, thanks to the second contact surface of the nozzle abutting on an abutment surface and the neck being axially compressed between the support surface of the mold and the first contact surface of the nozzle, with the abutment surface being substantially fixed along the axial direction with respect to the mold at least during the injection, the neck is compressed during the injection in a controlled way, so as to prevent leaks towards the external wall of the neck.

Since the nozzle movement towards its injection position is stopped by the second contact surface of the nozzle abutting on the abutment surface, the actuators of the nozzle may be of a traditional type, like a pneumatic piston or the like, thus reducing the cost of the hydroforming station.

The axial deformation of the neck provides the desired contact pressure on the finish. That pressure is determined in order to obtain a reliable liquid tightness on the finish. Over its lifetime, the neck of the container will only once support such an axial deformation. This is very different from the seal ring 71 described in WO2013/096609, wherein the same seal ring has to endure a strong compression deformation for each manufactured container. Such a seal ring 71 has to endure millions of compression cycles during its lifetime. In the invention, as the material compressed and deformed to provide the sealing pressure is not included as part of the forming station, the forming station can have first and second contact surfaces robust enough to prevent wear and tear.

Alternatively, the assembly may include one or several of the following features, taken in isolation or in any feasible combination: the nozzle in the injection position is closer to the mold than in the intermediate position, and the axial distance from the intermediate position to the injection position is greater than 0.1 mm; the neck has an initial axial extension when the nozzle is in the retracted position, and has a reduced axial extension when the nozzle is in the injection position; the location of the abutment surface along the axial direction, and the axial distance between the first contact surface and the second contact surface, are adapted so that the difference between the initial axial extension and the reduced axial extension ranges from 0.2 mm to 0.4 mm, and is preferably around 0.3 mm; and the nozzle comprises at least an end part made of metal and defining the first contact surface.

Thanks to the metallic contact between the nozzle and the finish, the sealability of that contact is very stable for use with successive formed containers. Additionally the sealing surface is easy to clean.

According to another optional feature, the end part is integral and further defines the second contact surface. This provides a very stable sealing force on the finish, independent from vibration or shocks within the station.

According to another optional feature, the end part comprises a distal part defining the second contact surface, a proximal part, and a laminated shim located between the distal part and the proximal part along the axial direction, the laminated shim being suitable for adjusting the axial distance between the first contact surface and the second contact surface by varying the axial dimension of the shim. This provides both a very stable and an adjustable sealing force.

According to another optional feature, the abutment surface is defined by the mold. This allows high throughput for the forming station because the force moving the injection nozzle can be increased in order to reduce the cycle time. According to another optional feature, the abutment surface is defined by the support ring, the abutment surface being axially opposed to a contact surface of the support ring, the contact surface being in contact with the support surface of the mold. This provides a better stability of the preform within the mold during the injection. According to another optional feature, the assembly further comprises an injection head including a head body having a fixed axial position with respect to the mold at least while the injection nozzle is in the injection position, the injection nozzle being axially movable with respect to the head body. This allows free space around the neck of the preform which can be used for another function, such as implementing a sensor or the like.

According to another optional feature, the abutment surface is defined by a stop element rigidly fixed to the head body at least while the injection nozzle is in the injection position and axially adjustable with respect to the head body so as to adapt the assembly to different initial axial extensions of the neck. This allows both a free space around the preform neck and an adjustable station for different neck heights.

According to another optional feature, the first contact surface of the nozzle is perpendicular to the axial direction. This minimizes the deformation of the neck during the forming of the container.

According to another optional feature, the second contact surface of the nozzle laterally extends from the neck or has a "C" shape around the neck, so as to enable an access to the neck from a free side of the neck while the injection nozzle is in the intermediate position. Said access from a free side of the neck can be used for example by a gripper. This reduces the length and duration of the reciprocating movement of the injection nozzle, and increases the throughput of the forming station.

The invention also relates to a method for hydroforming a container from a preform having a neck extending along an axial direction, the neck comprising a support ring protruding radially, and a finish axially opposed to the support ring, the method comprising the steps of: placing the preform in a mold so that the support ring is in contact with a support surface of the mold; moving an injection nozzle along the axial direction with respect to the mold from a retracted position wherein the nozzle is away from the neck, to an intermediate position wherein a contact is established between a first contact surface of the nozzle and the finish; further moving the nozzle from the intermediate position to an injection position, wherein a second contact surface of the nozzle abuts on an abutment surface and the neck is axially compressed between the support surface and the first contact surface, the first contact surface being less deformable than the neck in the axial direction; and injecting a liquid from the nozzle into the preform, the nozzle being in the injection position, the abutment surface being fixed along the axial direction with respect to the mold at least during said injecting.

The method may additionally or alternatively include the following features: the neck has an initial axial extension when the nozzle is in the retracted position, and has a reduced axial extension when the nozzle is in the injection position, the location of the abutment surface along the axial direction, and the axial distance between the first contact surface and the second contact surface being adapted so that the difference between the initial axial extension and the reduced axial extension is greater than 0.1 mm, preferably ranges from 0.2 mm to 0.4 mm, and is more preferably around 0.3 mm, and/or the axial distance along which the injection nozzle is moved during said moving of the nozzle from the intermediate position to the injection position is greater than 0.1 mm, preferably ranges from 0.2 mm to 0.4 mm, and is more preferably around 0.3 mm.

BRIEF DESCRIPTION OF THE DRAWINGS

Other aspects and advantages of the invention will appear upon reading the following description, given by way of example and made in reference to the appended drawings, wherein.

DETAILED DESCRIPTION OF THE INVENTION

In the following description, the terms "upper" and "lower" are defined relative to an axial direction D, which corresponds to the axis of a container to be produced. For example the axial direction D extends substantially vertically when the container is placed on its bottom.

Figure 2:
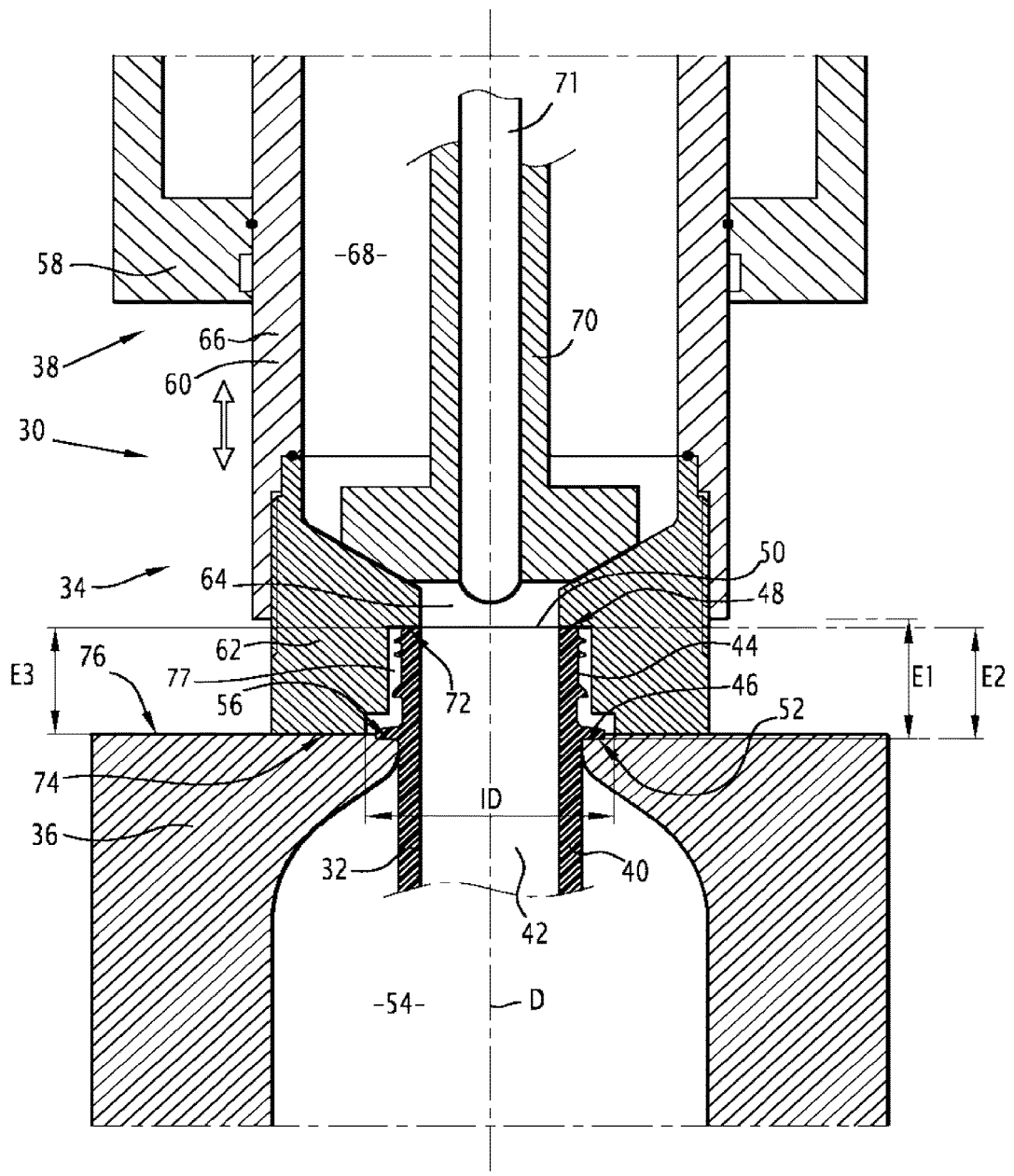
FIG. 2 is a diagrammatical axial cross-section view of an assembly embodying the principles of the present invention.

Referring to FIG. 2, seen therein is an assembly 30 of a preform 32 and a station 34, the station 32 being for hydroforming a container (not shown) from the preform.

The assembly 30 is substantially symmetrical around the axial direction D.

The station 34 comprises a mold 36 for receiving the preform 32, and an injection head 38 suitable for injecting a liquid into the preform in order to shape the preform 32 into the container and advantageously also in order to fill in the container.

Figure 1:
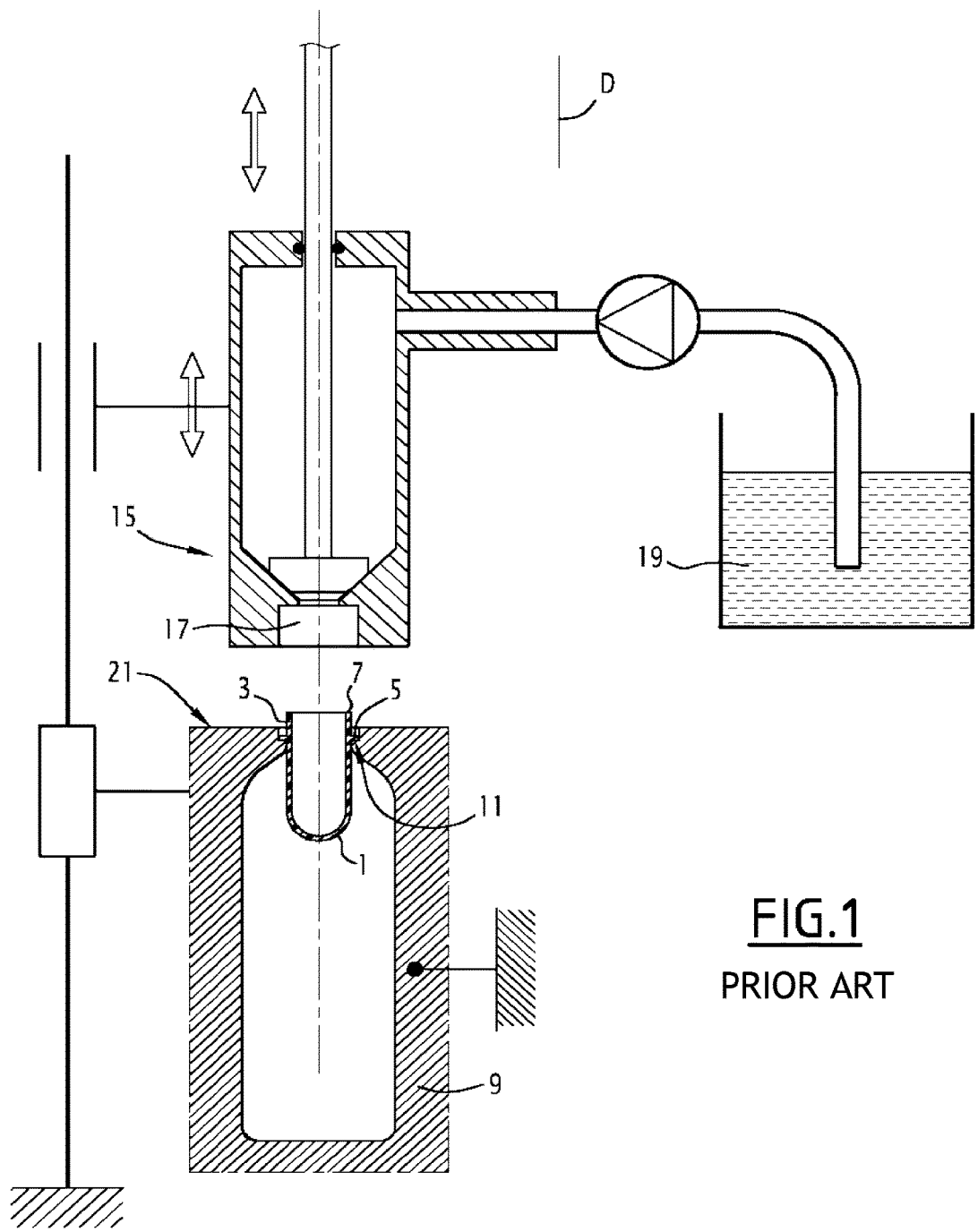
FIG. 1 is a diagrammatical view of a prior art hydroforming station.

The preform 32 seen in FIG. 2 and the preform 1 shown in FIG. 1 may be similar. The preform 32 comprises a hollow body 40 defining an inner volume 42, and a neck 44 extending along the axial direction D. The preform 32 may have a shape similar to that of a test tube being closed at a lower end along the axial direction D and having the neck 44 at an upper end. In FIG. 2, the closed end of the preform 32 is not illustrated.

The preform 32 is made of any suitable plastic materials, such as polyesters, such as polyethylene terephthalate (PET), polyethylene naphthalate (PEN), polyethylene imine (PEI), polytrimethylene terephthalate (PTT), polylactic acid (PLA), polyethylene furanoate (PEF), or polyolefins, such as polyethylene low density (LDPE) or high density (HDPE), polypropylene (PP), or styrene based materials such as polystyrene (PS), acrylonitrile butadiene styrene (ABS) or other polymers, such as polyvinyl chloride (PVC).

The preform 32 is generally produced according to an injection molding process and molded at a site different from the site where the station 34 is located.

The hollow body 40 is for example cylindrical and extends axially.

The neck 44 generally has the final shape of the neck of the container to be produced. The neck 44 comprises a radially protruding support ring 46, and a finish 48 axially adjacent to the support ring and defining an opening 50 of the preform 32 along the axial direction D.

A lower surface of the support ring 46 defines a first contact surface 52 of the neck 44 with the station 38. The first contact surface 52 is for example substantially perpendicular to the axial direction D and has an annular shape surrounding the neck 44.

The mold 36 for receiving the preform 32 defines a molding cavity 54 having the shape of the container to be produced. The mold 36 also defines a support surface 56 adapted to support the first contact surface 52 of the support ring 46. When the preform 32 is placed in the mold 36, the neck 44 protrudes from the mold 36 and the first contact surface 52 rests on the upper surface of the mold, said upper surface of the mold 36 defining the support surface 56.

The mold 36 if formed in at least two parts (not shown) that are movable relative to each other, between an open position, wherein the preform 32 can be placed in the mold and the formed container can be retrieved from the mold, wherein the two parts define together the molding cavity 54, and a closed position when the preform is located in the mold, wherein said molding cavity is closed in a liquid tight manner. The two parts are for example hinged together and are movable in rotation relative to each other around an axis substantially parallel to the axial direction D.

The injection head 38 comprises a head body 58 and an injection nozzle 60.

The head body 58 is for example in a fixed axial position with respect to the mold 36. By "fixed" it is meant that the head body 58 is immovable relative to the mold 36 along the axial direction D.

The nozzle 60 comprises an end part 62 defining an outlet 64 for the liquid to be injected into the preform, and a nozzle body 66 attached to the end part, the nozzle body 66 and the end part 62 defining an internal chamber 68 for the liquid to be injected into the preform 32. The nozzle 60 also comprises a control rod 70 extending axially within the internal chamber 68 and movable axially with respect to the nozzle body between a closed position, in which an extremity of the control rod 70 is in liquid tight contact with the end part 62 in order to close the outlet 64, and an open position, in which the control rod 70 is spaced away from the end part 62 in order to allow the liquid to flow out of the internal chamber 68.

The injection nozzle 60 may further comprise a stretch rod 71 in the center of the control rod 70. The stretch rod 71 is known per se and will not be further described here.

The nozzle 60 is movable in the axial direction D with respect to the mold 36 from a retracted position, wherein the nozzle is away from the neck 44, to an intermediate position, where contact is established between a first contact surface 72 of the nozzle and the finish 48 of the neck 44, and further to an injection position (shown in FIG. 2), wherein a second contact surface 74 of the nozzle abuts on an abutment surface 76 and the neck 44 is axially compressed between the support surface 56 of the mold 36 and the first contact surface 72.

The nozzle 60 is closer to the mold 36 in the injection position than in the intermediate position along the axial direction D. The axial distance between the intermediate position and the injection position is for example greater than 0.1 mm. The retracted position of the nozzle 60 can be obtained from FIG. 2 by moving the nozzle up along the axial direction D with respect to the mold 36, so that the end part 62 is away from the mold 36 and the neck 44 to allow the mold to be opened.

The intermediate position can be obtained from FIG. 2 by moving the nozzle 60 upward with respect to the mold 36 in the axial direction D, so that the end part 62 is away from the mold, but still in contact with the neck 44 which expands axially between the support surface 56 of the mold and the first contact surface 72. In the intermediate position, the neck 44 is only in contact with the first surface 72 and is not compressed.

The end part 62 is integral and, for example, made of metal. The end part 62 is for example screwed into the nozzle body 66 along the axial direction D.

In the injection position, the end part 62 surrounds the neck 44 around the axial direction D. A space 77 is provided between the neck 44 and the interior of the end part 62. The space may be used to host a sensor, for example, or may be radially close enough from the thread extremity to limit radial deformation of the neck 44 when a liquid under high pressure is injected into the preform 1.

The first contact surface 72 is for example formed by an inner shoulder of the end part 62. The first contact surface 72 is advantageously substantially perpendicular to the axial direction D. Therefore the axial movement of the injection nozzle will not provoke radial or lateral deformation of the neck 44.

The first contact surface 72 is less deformable than the neck 44 in the axial direction, meaning that the first contact surface 72 is not compressed in the axial direction when the first contact surface 72 is applied against the finish 48 of the neck 44. The first contact surface 72 compresses no seal that would be more deformable than the neck 44 along the axial direction D.

The second contact surface 74 is for example defined by a lower annular face of the end part 62, advantageously perpendicular to the axial direction D. The internal diameter ID of the second contact surface 74 is large enough so that the end part 62 does not abut against the support ring 46.

The abutment surface 76 is for example defined by an upper face of the mold 36, and is advantageously perpendicular to the axial direction D. The neck 44 of the preform 32 has an initial axial extension E1 when the nozzle 60 is in the retracted position, and has a reduced axial extension E2 when the nozzle is in the injection position. By "axial extension" it is meant the length of the neck 44 along the axial direction D.

The location of the abutment surface 76 along the axial direction D, and the axial distance E3 between the first contact surface 72 and the second contact surface 74 are adapted so that the difference between the initial axial extension E1 and the reduced axial extension E2 is greater than 0.1 mm, or ranges from 0.2 mm to 0.4 mm, and is preferably around 0.3 mm. This means that the length of the neck 44 in the axial direction D is reduced by 0.2 mm to 0.4 mm when the nozzle 60 is applied against the neck in the injection position.

The nozzle body 66 is for example made of a hollow cylinder. The nozzle body 66 is axially movable with respect to the head body 58. For example, the nozzle body 66 is axially movable within the head body 58 and displaced by a pneumatic system (not shown).

The internal chamber 68 is in fluidic communication with a source (not show) of the liquid to be injected into the preform 32.

The liquid to be injected in the preform 32 by the station 34 is for example the liquid that is intended to be in the container when the latter is used by an end user (not shown).

A method for hydroforming a container from the preform 32 using the station 34 (FIG. 2) will now be described.

First the preform 32 is placed in the mold 36. To do so, the mold 36 is moved to its open position, the preform 32 is put in the mold, and the mold 36 is moved back to its closed position.

In any case, the first contact surface 52 of the support ring 46 lies on the support surface 56 of the mold 36. The neck 44 is outside of the cavity 54.

Next, the injection nozzle 60 is moved down along the axial direction D with respect to the head body 58 from the retracted position to the intermediate position and contact is established between the first contact surface 72 of the end part 62 and the end surface of finish 48 of the neck 44.

At this point, the second contact surface 74 is not yet in contact with the abutment surface 76 of the mold 36 and the neck 44 has its initial axial extension E1. The axial distance between the second contact surface 74 and the abutment surface 76 is equal to E1 minus E2.

Next, the nozzle 60 is further moved down axially until the second contact surface 74 of the end part 62 abuts against the abutment surface 76. With the abutment surface 76 being fixed with respect to the mold 36, this stops the nozzle 60 in its injection position represented in FIG. 2.

While the nozzle 60 moves from its intermediate position to its injection position, the neck 44 is axially compressed progressively between the support surface 56 of the mold 36 and the first contact surface 72 of the end part 62. When the nozzle 60 reaches the injection position, the axial extension of the neck 44 is E2. In the injection position, the reduction of the axial extension of the neck 44 is equal to E1 minus E2.

The control rod 70 is then moved up in order to let the liquid flow from the internal chamber 68 of the nozzle 60 into the inner volume 42 of the preform 32. The liquid urges the hollow body 40 against the walls of the molding cavity 54 and the liquid shapes the preform 32 into the container (not represented). Advantageously, the liquid is also the liquid that fills the container. In other words, the liquid used for forming will be contained in the container and is intended to be used by an end user (not represented).

During the injection of the liquid into the preform 32, the finish 48 presses against the first contact surface 72, which prevents the liquid from flowing outwardly between the finish 48 and the first contact surface 72 and in the space between the neck and the interior of the end part 62.

After injection, the control rod 70 is again pressed against the end part 62 in order to seal the internal chamber 68, and next the nozzle 60 is moved up axially back to its retracted position.

The neck 44 is not any more axially compressed and expands along the axial direction D, for example until its axial extension is equal to the initial axial extension E1.

The end part 62, having a fixed axial extension E3, is adapted to provide the preform 32 with a given reduced axial extension E2.

If another kind of preform 32 is to be used, with a different initial axial extension E1, the end part 62 may be replaced by another end part having a different axial extension E3 between the first contact surface 72 and the second contact surface 74. In other words, due to its axial extension E3, the end part 62 is adapted to a given neck 44 having a given initial axial extension E1, and requesting a desired compression E1-E2 to act as a seal.

Thanks to the above mentioned features, the assembly 30 eliminates or at least greatly reduces the leak problems, while remaining economical and enabling a high production output. Furthermore, the pressure applied on the neck 44 by the nozzle 60 is precisely controlled, which reduces the risk of damaging the neck during the injection.

Figure 3:
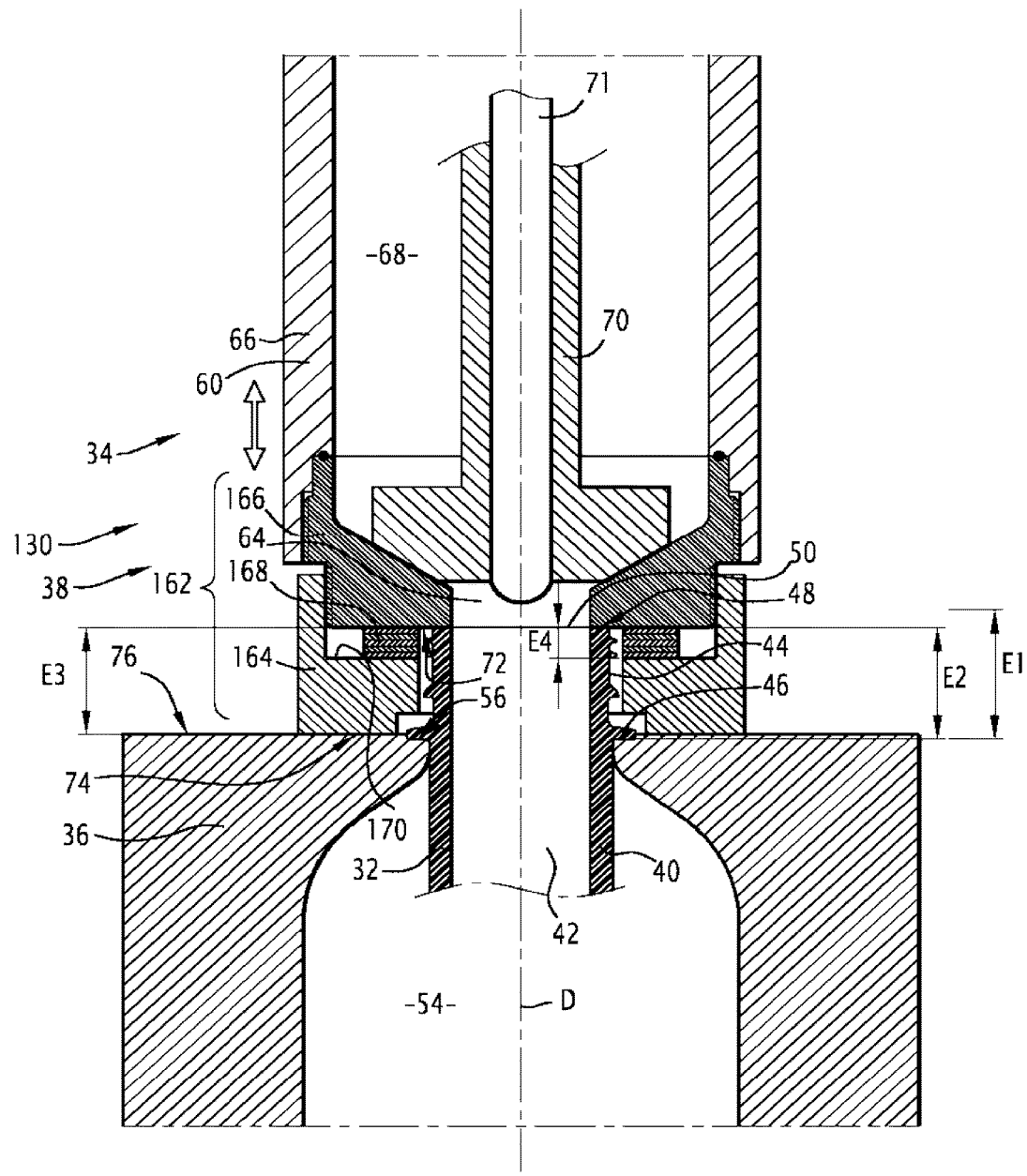
FIG. 3 is a diagrammatical axial cross-section view of another assembly embodying the principles of the present invention.

According to a second embodiment of the invention, an assembly 130 will now be described with reference to FIG. 3.

The assembly 130 is analogous to the assembly 30 shown in FIG. 2. The elements that are similar have the same numeral references and will not be described again. Only the differences will be described in detail hereafter.

The injection nozzle 60 of the assembly 130 comprises an end part 162 which differs from the end part 62 shown in FIG. 2.

The end part 162 includes a distal part 164 defining the second contact surface 74, a proximal part 166, and a laminated shim 168 interposed between the distal part and the proximal part along the axial direction D.

For example the distal part 164 is screwed on the proximal part 166 along the axial direction D.

For example a lower surface of the proximal part 166 defines the first contact surface 72.

The laminated shim 168 is for example located axially between a fourth contact surface 170 of the distal part 164 and the first contact surface 72. Such a laminated shim 168 is made of several layers of material and its extension or length in the axial direction D is adjustable by removing one or more layers of the laminated shim. The layers are for example peelable layers.

The fourth contact surface 170 if advantageously substantially perpendicular to the axial direction D.

The laminated shim 168 is adapted for adjusting the axial distance E3 between the first contact surface 72 and the third contact 74 surface by varying an extension E4 of the shim 168 along the axial direction D.

The assembly 130 is used in the same manner as the assembly 30, except that the end part 162 does not have to be replaced by another end part in case another preform 32 with a different neck 44 has to be shaped.

Figure 4:
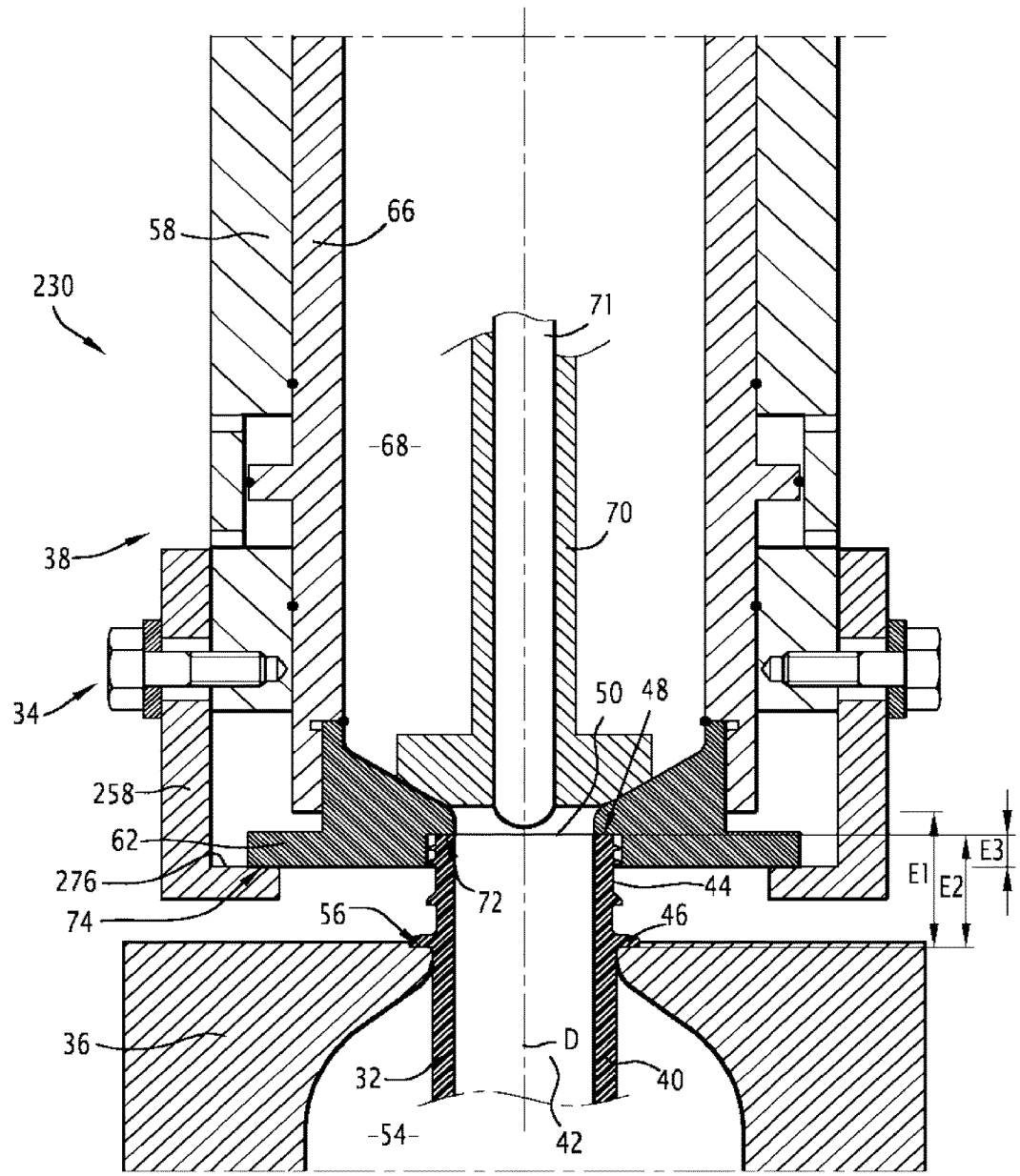
FIG. 4 is diagrammatical axial cross-section view of further assembly embodying the principles of the present invention.

By modifying the axial extension E4 of the laminated shim 168, it is possible to change the axial distance E3 of the end part 162, whereas the end part 62 has a fixed axial distance E3. According to a third embodiment of the invention, an assembly 230 will now be described in reference to FIG. 4.

The assembly 230 is analogous to the assembly 30 shown in FIG. 2. The elements that are similar have the same numeral references and will not be described again. Only the differences will be described in detail hereafter.

In the assembly 230, the abutment surface is not defined by the mold 36.

The head body 58 comprises a stop element 258 defining a stop which defines an abutment surface 276.

For example, the abutment surface 276 is defined by an upper face of a lower part of the stop element 258 along the axial direction D.

The stop element 258 is for example rigidly fixed to the head body 58 at least during the injection and advantageously axially adjustable with respect to the head body 58 so as to make the assembly 230 cope with different initial axial extensions E1 of the neck 44.

Figure 5:
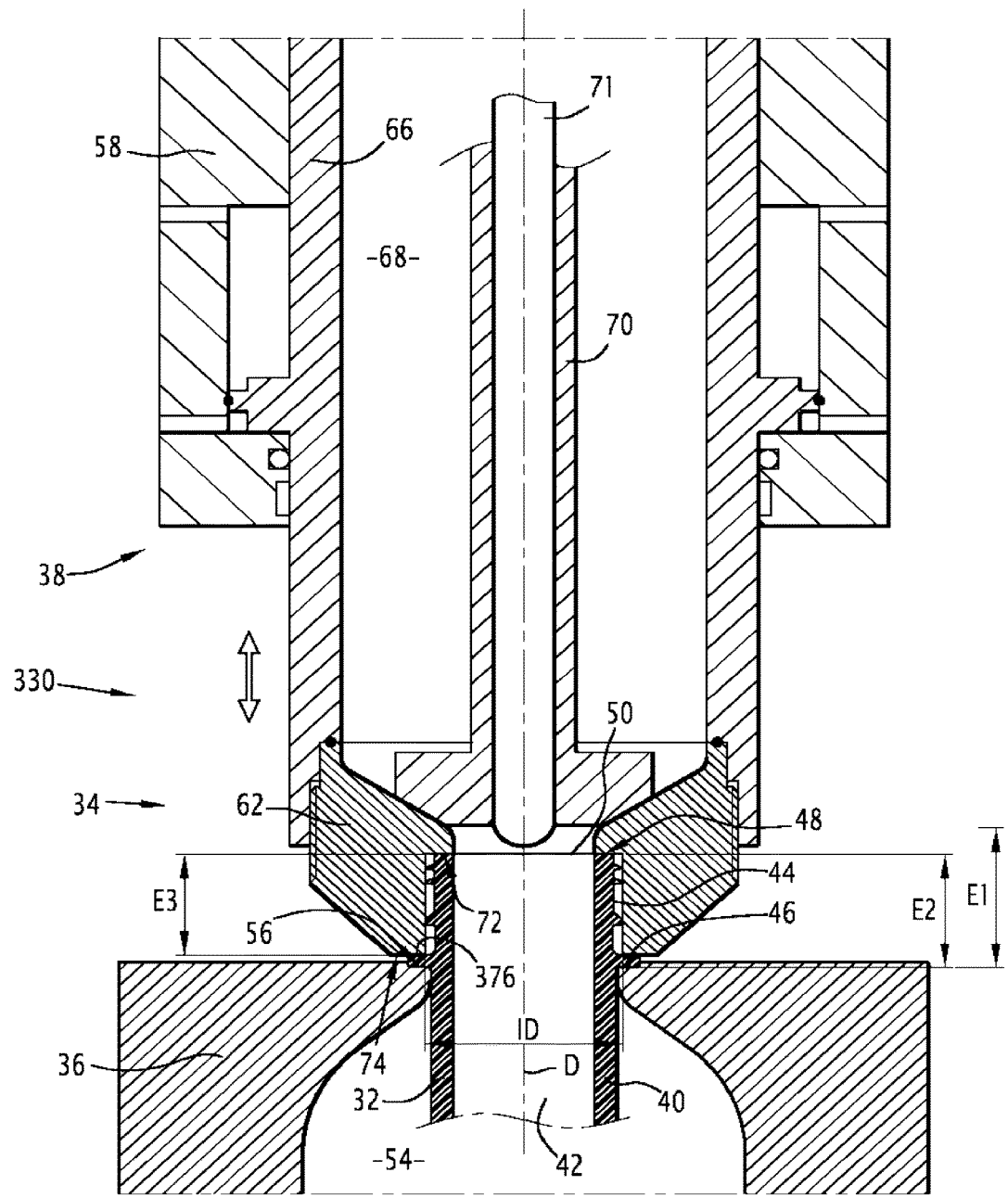
FIG. 5 is a diagrammatical axial cross-section view of yet another embodying the principles of the present invention.

According to a fourth embodiment of the invention, an assembly 330 will now be described in reference to FIG. 5.

The assembly 330 is analogous to the assembly 30 shown in FIG. 2. The elements that are similar have the same numeral references and will not be described again. Only the differences will be described in detail hereafter.

In the assembly 330, the end part 62 is adapted to abut against an upper face of the support ring 46. In other words, the support ring 46 defines an abutment surface 376.

The abutment surface 376 is opposed to the first contact surface 52 of the support ring 46 along the axial direction D.

The internal diameter ID of the second contact surface 74 is smaller than the external diameter of the support ring 46.

The lower part of the end part 62 is advantageously truncated along the axial direction D with a narrowing radial dimension towards the second contact surface 74.

In this embodiment, the support ring 46 being somewhat incompressible axially, its upper surface manages to act as an abutment surface for the end part 62.

Figure 6:
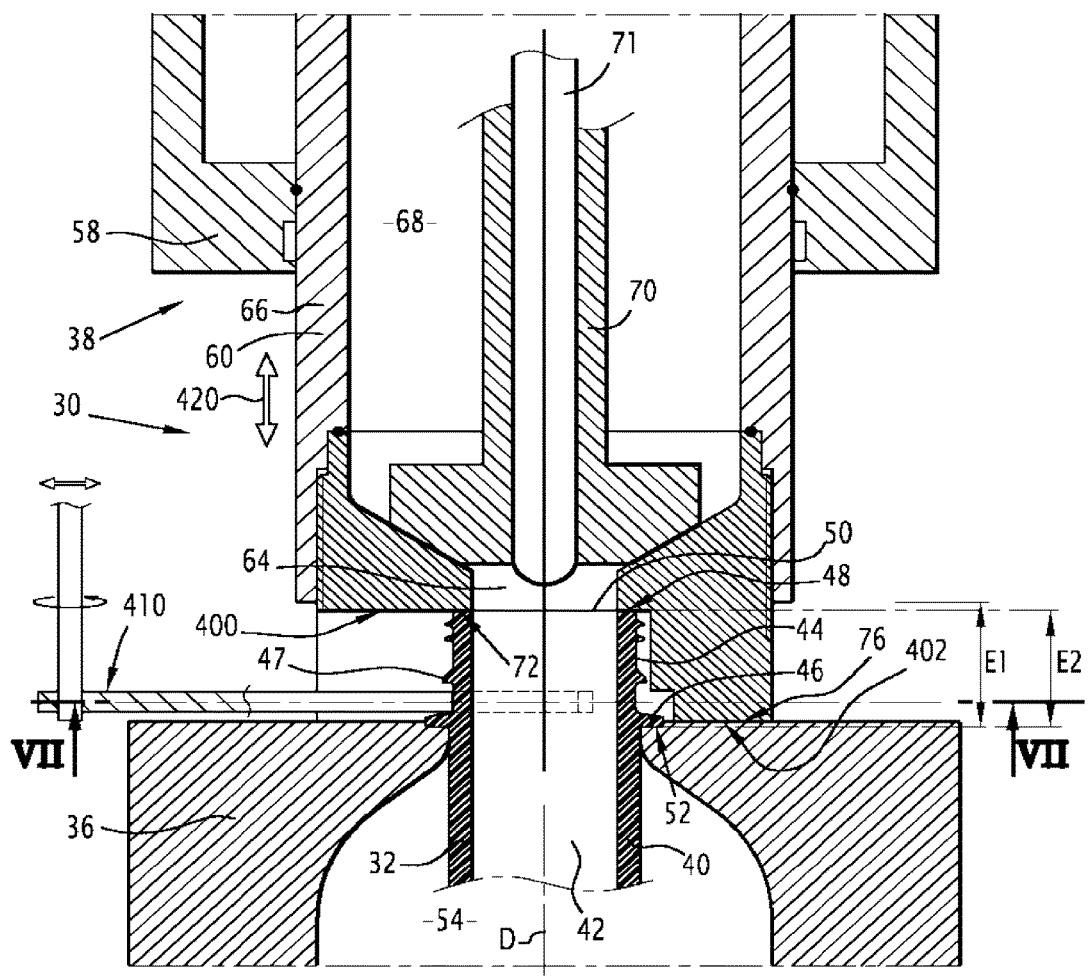
FIG. 6 is a diagrammatical axial cross-section view of a variant of the assemblies seen in FIGS. 2 and 3.
Figure 7:
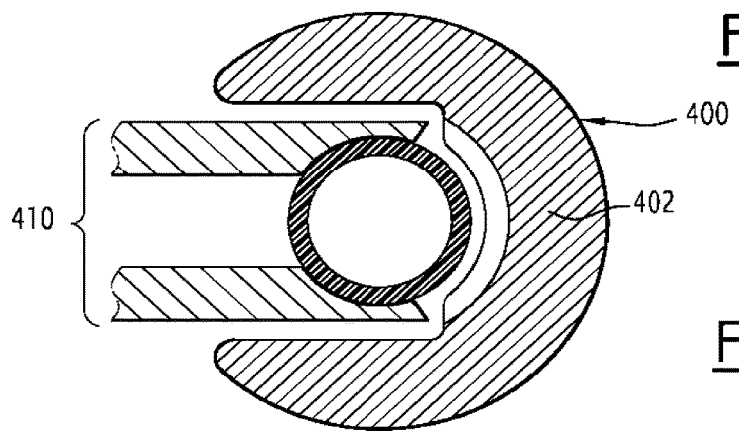
FIG. 7 is a transverse cross-section view generally taken along line VII-VII of FIG. 6.

A variant illustrated in FIGS. 6 and 7 defers from the first and second embodiments by the shape of the contact between the injection nozzle 60 and the mold 36. The end part 62 of the first embodiment or the distal part 164 of the second embodiment are replaced by a side part 400 providing a second surface 402 which is not annular. A pair of grippers 410, that are generally not included in the forming station shown in FIG. 6, can access around the neck 44 from a free side of the neck. The grippers 410 are connected to the neck 44 at an axial position located between the support ring 46 and a holding ring 47. As illustrated in FIG. 7, the second contact surface 402 is limited to the space left free by the grippers 410 connected with the neck 44.

Such a variant has the same advantages as the first and the second embodiments, providing a robust direct stop of the injection nozzle 60 against the mold 36, together with a reliable sealing on the finish 48 and a robust and easy to clean contact surfaces. The variant provides an additional advantage. It allows a reduction of the length and the duration of the axial movement requested for the injection nozzle 60. Said axial movement is indicated by the arrow 420. This reduces the transition step of the forming process and allows higher throughputs of the forming station.

The above assemblies and methods have been described for a mold 36 that is placed under the nozzle 60. However, the assembly and methods are also suitable for a machine wherein the mold is placed above the nozzle, simply by interchanging the terms "up" and "down" used above.

The assemblies and methods can also be adapted for a non-vertical axial direction D.

The invention claimed is:

1. A method of hydroforming a container from a preform, the preform having a neck extending along an axial direction, the neck including a support ring protruding radially, and a finish axially adjacent to the support ring, the method comprising the steps of:
    placing the preform in a mold so that the support ring is in contact with a support surface of the mold;
    moving an injection nozzle with respect to the mold from a retracted position to an intermediate position, in the retracted position the nozzle being spaced away from the neck, in the intermediate position a first contact surface of the nozzle being in contact with the finish;
    further moving the nozzle from the intermediate position to an injection position, in the injection position a second contact surface of the nozzle being in abutting engagement with an abutment surface and the neck being axially compressed between the support surface and the first contact surface, the first contact surface being less axially deformable than the neck; and
    injecting a liquid from the nozzle into the preform while the nozzle is in the injection position, the abutment surface being axially fixed with respect to the mold during the injecting of the liquid.

2. The method according to claim 1, wherein the neck has a first axial length when the nozzle is in the retracted position and has a second axial length when the nozzle is in the injection position.

3. The method according to claim 1, wherein the first axial length is greater than 0.1 mm more that the second axial length.

4. The method according to claim 1, wherein an axial distance along which the injection nozzle is moved during moving of the nozzle from the intermediate position to the injection position is greater than 0.1 mm.

5. The method according to claim 1, wherein a first axial distance is defined between the abutment surface and an axial end surface of the neck when the nozzle is in the retracted position, and a second axial distance is defined between the first contact surface and the second contact surface, the first axial distance being greater than the second axial distance.

6. The method according to claim 5, wherein the first axial distance is at least 0.1 mm greater than the second axial distance.

7. The method according to claim 5, wherein the first axial distance in a range of 0.2 mm to 0.4 mm greater than the second axial distance.

8. The method according to claim 5, wherein the first axial distance is about 0.3 mm greater than the second axial distance.

9. The method according to claim 1, wherein an axial distance along which the injection nozzle is moved from the intermediate position to the injection position is in the range of 0.2 to 0.4 mm.

10. The method according to claim 2, wherein an axial distance along which the injection nozzle is moved from the intermediate position to the injection position is 0.3 mm.

* * * * *